(No Model.) 2 Sheets—Sheet 1.

C. E. SACKETT.
CARROTING MACHINE.

No. 577,626. Patented Feb. 23, 1897.

WITNESSES: Bronson S. Burr. M. E. Ryan

INVENTOR Chas. E. Sackett

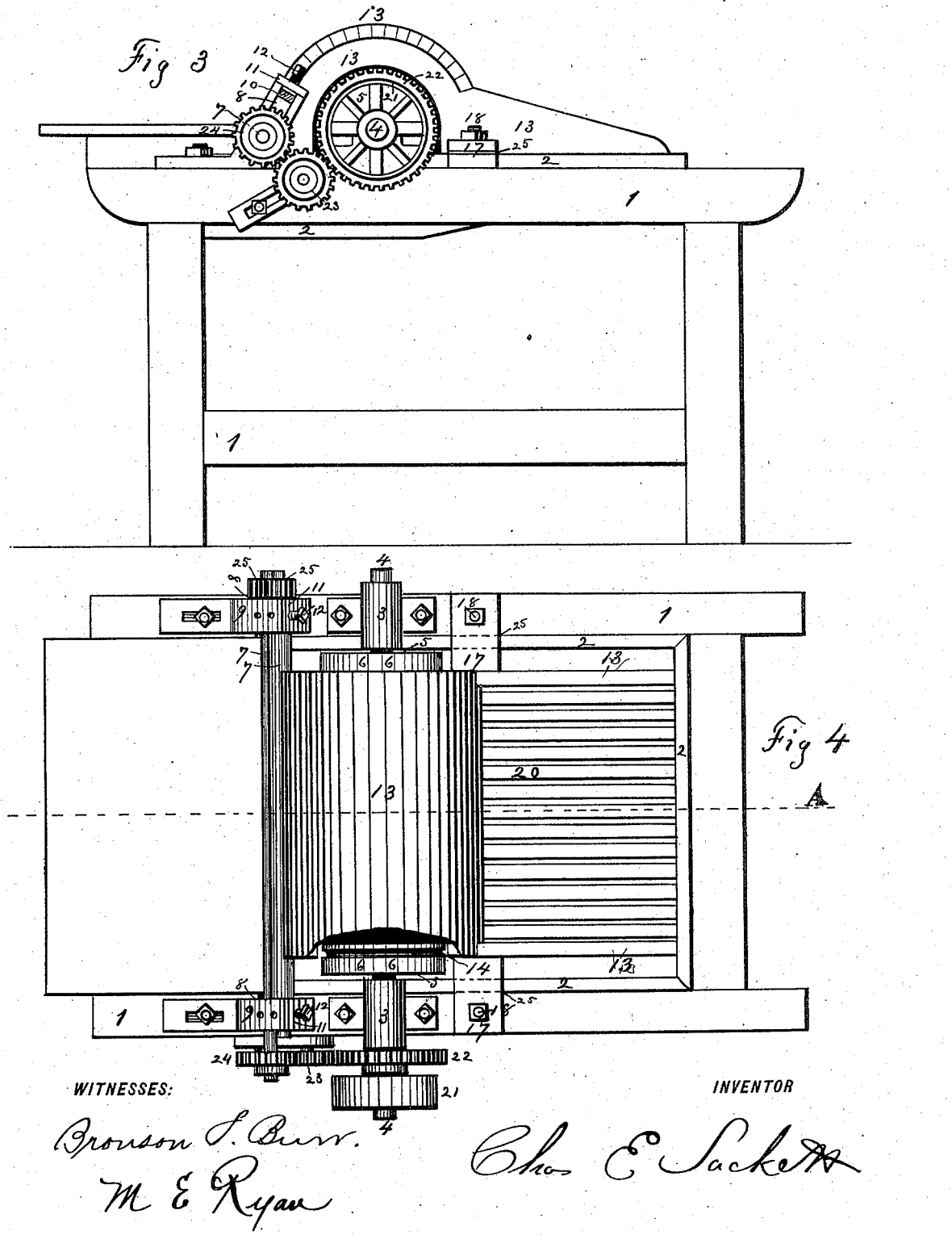

UNITED STATES PATENT OFFICE.

CHARLES E. SACKETT, OF DANBURY, CONNECTICUT.

CARROTING-MACHINE.

SPECIFICATION forming part of Letters Patent No. 577,626, dated February 23, 1897.

Application filed July 11, 1896. Serial No. 598,884. (No model.)

*To all whom it may concern:*

Be it known that I, CHARLES E. SACKETT, a citizen of the United States, and a resident of the city of Danbury, in the county of Fairfield and State of Connecticut, have invented a new and useful Improvement in Carroting-Machines, of which the following is a specification and, in connection with the accompanying drawings, is a full, clear, and exact description of the same.

My invention relates to improvements in machines for carroting fur, a staple used in the manufacture of hats.

The process of carroting fur consists in rubbing a liquid solution of nitrate of mercury into the fur while it is on the skin and drying it out more or less by means of brushes. The solution used is very destructive to all metals or machinery and to the operators unless they are protected from the spattering carrot by machines well housed. The process has long been confined to the use of hand-brushes; but recently cylindrical brushes have come into use, the skins being fed to the brush through a pair of rubber-covered feed-rolls. The rolls furnish the only bearing-point against which the brush can rub in the carrot, and as both rolls and brush are moving in the same direction a very high speed of brush has to be used to get much rubbing-in done, while high speed is objectionable with an open brush, as is most frequently used, as it throws the carrot and injures the operator, who has to breathe its fumes.

The object of my invention is to construct a machine with very few and simple working parts, which protect the operator, which can be made mostly of wood, so as to minimize the destructive effect of the carrot on metal, and to give the fur on the skin a much longer bearing-surface in passing through the machine, so that the carrot may be more thoroughly rubbed in in one quick passage than can be done by any machines now in use. This I accomplish by leading the skin up over the top of the brush and confining it to its action throughout its entire passage to the rear of the brush instead of returning it to the front over the top feed-roller, or leading it downward behind the bottom feed-roller, or running it straight through below or above, the brush touching it at only one point, as is done in machines now in use, and as will be more fully hereinafter described and claimed.

In the accompanying drawings like figures relate to like parts.

Figure 1:
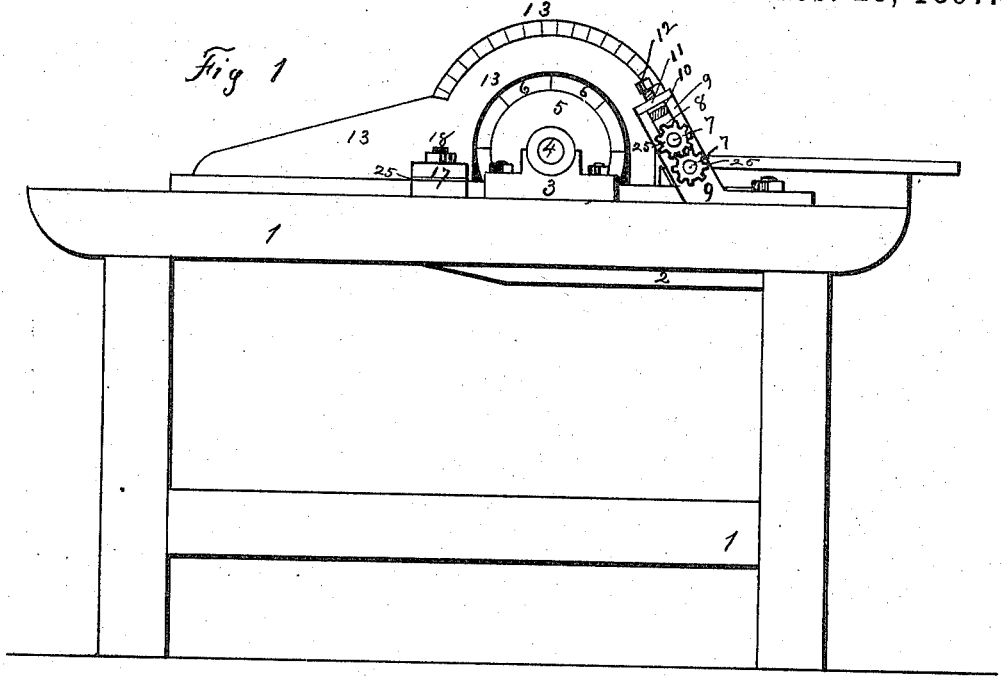
Figure 2:
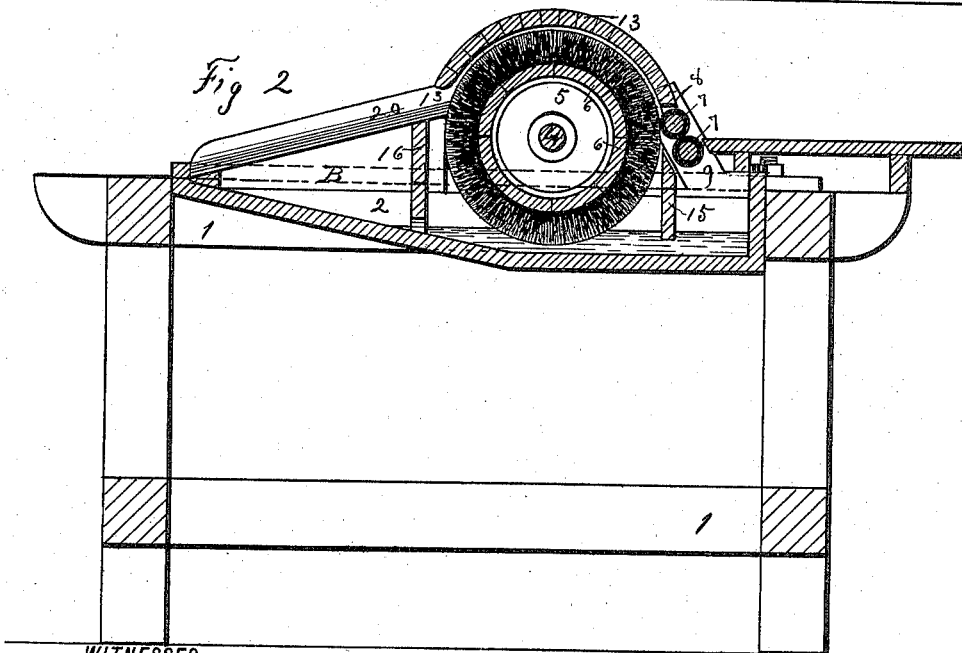

Figure 1 is a left-hand elevation. Fig. 2 is a section through the dotted line A on plan view, Fig. 4. Fig. 3 is a right-hand elevation. Fig. 4 is a plan view.

1 is a suitable frame, preferably of wood. 2 is a tank supported in the frame to hold the carrot. The tank should be made of stone or pottery-ware. The carrot is supplied to the tank from time to time as required. The carrot is very destructive to all metals. I therefore place on either side of the tank, bedded on the frame but sufficiently far from the brush to be protected from the carrot, metal boxes 3 3, which carry a shaft 4, supporting cylinder-heads 5 5, across which are secured brush-lags 6 6. The lags are filled with a vegetable-root fiber which is adapted to resist the action of the carrot, but brush and lags should be made so as to be easily renewed, and for this purpose I construct the parts so that the brush and shaft are easily removable.

The brush should be bedded in the boxes so that the brush-bristles reach nearly to the bottom of the tank. In front of the brush and parallel with it are placed a pair of rubber feed-rolls 7 7. They are journaled in boxes 8 8, sliding in frames 9 9 and bedded on the frame 1. The boxes are held in elastic contact by rubber blocks 10 10, placed above them, and the caps 11 11. Set-screws 12 12 operate through the caps to regulate the pressure between the rubber rolls. The rolls are bedded on the frame 1 as low down relatively to the center of the brush as can be conveniently arranged. The object of this is to have as great an area of brushing-surface above the rolls and between the front and back of the machine as can be obtained. To this end the rolls should be of as small diameter and the brush of as large diameter as possible, so that it may have a bearing or brushing surface over the entire length of the skin at one time. The office of the rolls is merely to feed the skin into the brush at a fixed rate of speed and hold the skin against the action of the brush at the same time. As they hold at only one point, a large diameter of roll, as used in some machines, is unnecessary.

The office of the brush in my machine is as soon as the first inch of skin is fed onto the brush by the rolls to begin rubbing in the carrot and to keep doing so until the whole skin has passed onto the machine, when the action is simultaneous over the whole skin at once. To accomplish this requires a long bearing-surface, and to provide this, as well as to house the brush securely, so that it cannot throw any carrot except back into the tank at its delivery end, I construct over the brush from the top of the feed-rolls in front to a convenient point in its rear a close cap 13, made, preferably, of wood, and whose interior surface conforms to the periphery of the brush. Its sides fit close around the brush-bristles down to the lags. The cap confines all the carrot delivered by the bristles within it. To prevent the side drip running out along the lags and reaching the shaft journals and boxes, I construct in the lags just below the sides of the cap a recess 14, which causes all the drip to be returned into the tank below the brush. This construction I show clearly in Fig. 4 by cutting away part of the cap at one end.

At the rear of the brush and just below the terminus of the cap I arrange a grating 20 or any resisting medium having interstices and in close contact with the brush to strip the skins from the brush as they come out from below the cap. The object of the interstices is to let any flying carrot that comes with the skin pass through them downward into the tank, which is extended out below the grating for that purpose, as shown in Fig. 2.

In front of the brush and between it and the lower feed-roll 7 I place a guard-board 15, extending from about the center of the brush downward to the bottom of the brush or just below the level of the carrot in the tank. This prevents any carrot being dashed up below the rolls, but leads it up behind the rolls, where the brush applies it to the skin. Behind the brush I place a similar board 16 to prevent any splash in that direction. It is essential that the inside of the cap 13, which is made to conform to the periphery of the brush, should constitute an adjustable bearing-surface over the entire upper part of the brush, which is the essential feature of this invention, and in order that it should be adjustable as to space between the brush and cap I provide outer lugs 17 17, attached to the cap, which are pierced for bolts 18 18, attached to the frame, and by inserting lining-pieces 25 25 between the cap-lugs and the frame it is held in position at any desired height above the brush to accommodate different thicknesses of skins. I do not confine myself to this method of adjustment, but give it as a desirable simple method. A still more simple method is to leave the nuts on the bolts 18 18 loose and let the weight of the cap on the skin furnish the necessary pressure. The cap then becomes automatically adjustable to any thickness of skin by its rise and fall. The cap is made removable along the line B, as shown in section, Fig. 2, so that the brush and shaft are then easily removable and the tank all exposed for cleaning, as is frequently necessary.

The brush is driven by a pulley 21, placed at one end of the shaft 4, on which also is fastened a gear-wheel 22. This drives the rolls by means of an intermediate gear 23, which is adapted to allow the gear 24 on the end of the roll-shaft to be moved up with the roll as wear on the brush takes place. The two rolls are driven in unison by means of the gears 25 25 on the other end of the roll-shafts. By a suitable arrangement of gears any relative speed of brush and rolls is maintained.

The operation of the machine is very simple. The skins are fed in between the rolls 7 7 fur side down. There they are met by the brush, whose bristles are charged with carrot from the tank. The periphery of the brush is moving many times faster than the speed of the skin it meets. The skin is turned upward by the brush and carried beneath the cap. The rubbing-in action of the brush then takes place inch by inch as the skin is fed, and is continuous and prolonged during the whole length of the skin until the rolls let go of the end of the skin, when the brush carries it over to meet the grating in the rear, on which it is discharged. It is evident that this prolonged brushing of the fur in one direction in conjunction with a liquid will slick the fur all down and leave the hairs all laid in one direction, as is desirable in this process, the whole being done in a very simple manner.

I am aware that Letters Patent for a carroting-machine having a very small brush surrounded by a number of large rolls having a single bearing-point above or below the brush, the skins passing through on a level and touching the brush at but one point of its periphery, have been granted; also for a carroting-machine that delivers the skin downward in front of the brush; but the use of feed-rolls and a revolving carroting-brush bearing against the rolls has long been public property. I do not claim these as my invention, but only my devices for simplifying the general construction and usefulness of the machine and for securing a simple and prolonged action of the brush by increasing the bearing-surface, so that carroting may be well done in one passage of the skin through the machine.

Having thus described my invention, what I claim, and desire to secure by Letters Patent, is—

1. In a carroting-machine the combination of a revolving brush, a pair of feed-rolls arranged in its front, means to supply a liquid carrot to the brush, and a close cap covering the upper surface of the brush conforming within to its periphery, spreading from side to side of said brush and extending from the feeding-rolls in front to the rear of the brush, between which cap and the brush-surface the skin is passed in the act of being carroted, said cap having a bearing upon the surface of the skin as it passes, simultaneously throughout its length and breadth, means to adjust the distance between the cap and brush, thereby regulating the pressure upon the skin, and means to strip the skin from the brush as it comes out from below the cap in the rear, for the purpose set forth, and substantially as described and shown.

2. In a carroting-machine the combination of a revolving brush, a pair of feed-rolls, a close cap covering the upper section of the brush, and a liquid-carrot supply, all constructed and arranged to rub the liquid carrot into the fur of the skin simultaneously throughout its entire length and breadth, for the purpose set forth and substantially as described and shown.

In testimony that I claim the foregoing as my invention I have signed my name, in presence of two witnesses, this 1st day of July, 1896.

CHAS. E. SACKETT.

Witnesses:
BRONSON S. BURR,
M. E. RYAN.